(12) United States Patent
Greene et al.

(10) Patent No.: US 10,851,851 B2
(45) Date of Patent: Dec. 1, 2020

(54) ELECTRO-MECHANICAL CLUTCH APPARATUS

(71) Applicant: Magna Powertrain, Inc., Concord (CA)

(72) Inventors: Darrell F. Greene, Bradford (CA);
Adrian C. Cioc, Richmond Hill (CA);
Sean A. Steele, Mississauga (CA);
David V. Dorigo, Concord (CA)

(73) Assignee: MAGNA POWERTRAIN INC., Concord (CA)

( * ) Notice: Subject to any disclaimer, the term of this patent is extended or adjusted under 35 U.S.C. 154(b) by 613 days.

(21) Appl. No.: 15/511,257

(22) PCT Filed: Oct. 7, 2015

(86) PCT No.: PCT/US2015/054446
§ 371 (c)(1),
(2) Date: Mar. 15, 2017

(87) PCT Pub. No.: WO2016/057640
PCT Pub. Date: Apr. 14, 2016

(65) Prior Publication Data
US 2017/0248174 A1 Aug. 31, 2017

Related U.S. Application Data

(60) Provisional application No. 62/060,625, filed on Oct. 7, 2014.

(51) Int. Cl.
*F16D 41/12* (2006.01)
*F16D 27/09* (2006.01)
(Continued)

(52) U.S. Cl.
CPC ............. *F16D 27/09* (2013.01); *F16D 41/12* (2013.01); *F16D 41/14* (2013.01); *F16D 27/004* (2013.01);
(Continued)

(58) Field of Classification Search
None
See application file for complete search history.

(56) References Cited

U.S. PATENT DOCUMENTS 1,767,593 A * 6/1930 Laabs ..................... F16D 41/12
192/42
8,079,453 B2 12/2011 Kimes
(Continued)

FOREIGN PATENT DOCUMENTS

| CN | 2136899 Y | 6/1993 |
|---|---|---|
| CN | 1091365 A | 8/1994 |

(Continued)

OTHER PUBLICATIONS

International Search Report and Written Opinion dated Apr. 4, 2016 from International Patent Application Serial No. PCT/US2015/054446.

*Primary Examiner* — Charles A Fox
*Assistant Examiner* — Ryan P Dodd
(74) *Attorney, Agent, or Firm* — Dickinson Wright PLLC

(57) ABSTRACT

An electro-mechanical clutch apparatus includes a stationary member (22,122) having a center portion extending along an axis A and a stationary coil assembly (34,134) fixed about the center portion. A rotatable member (46,146) extends along the axis A and includes an annular projection (52,152) radially spaced from the coil assembly. A ratchet surface (29,129) presents a plurality of teeth disposed in axially aligned and radially spaced relationship with the annular projection. The rotatable member includes a mag- (Continued)

netic pole piece (62,162) disposed in radially spaced and concentrically aligned relationship with said coil assembly. The rotatable member includes a locking member (58,158) pivotably attached to the annular projection and pivotable between an engaged position in engagement with one of the teeth in response to the coil assembly being de-energized and a released position displaced from engagement with the teeth and attracted towards the magnetic pole piece in response to the coil assembly being energized.

19 Claims, 5 Drawing Sheets

(51) Int. Cl.
*F16D 41/14* (2006.01)
*F16D 27/01* (2006.01)
*F16D 27/10* (2006.01)
*F16D 27/00* (2006.01)
*F16D 41/30* (2006.01)

(52) U.S. Cl.
CPC .............. *F16D 27/01* (2013.01); *F16D 27/10* (2013.01); *F16D 41/30* (2013.01)

(56) References Cited

U.S. PATENT DOCUMENTS

| | | | |
|---|---|---|---|
| 8,276,725 | B2 | 10/2012 | Swales et al. |
| 8,403,123 | B2 * | 3/2013 | Bird ...................... F16D 27/102 192/84.31 |
| 8,418,825 | B2 | 4/2013 | Bird |
| 8,491,439 | B2 | 7/2013 | Kimes |
| 2014/0291100 | A1 | 10/2014 | Sharp |

FOREIGN PATENT DOCUMENTS

| | | |
|---|---|---|
| CN | 1727715 A | 2/2006 |
| JP | S5425963 U | 2/1979 |
| WO | WO0008356 A1 | 2/2000 |

* cited by examiner

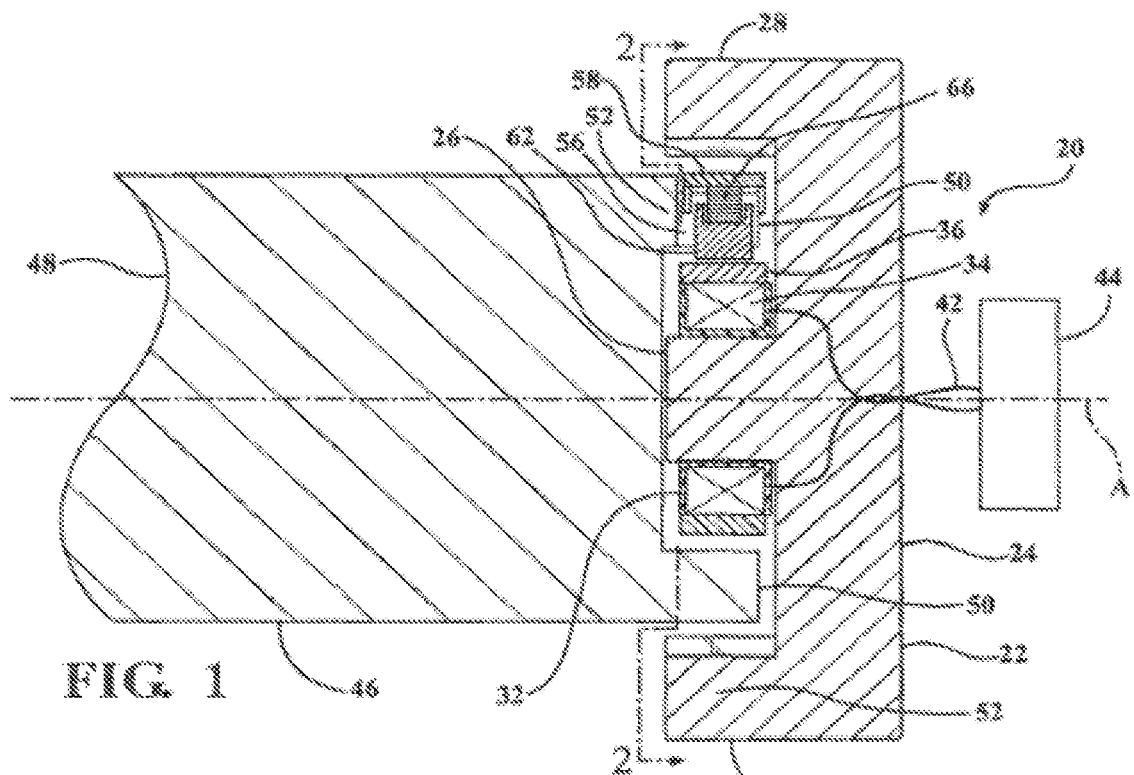

ELECTRO-MECHANICAL CLUTCH APPARATUS

CROSS REFERENCE TO RELATED APPLICATION

This application claims priority to and the benefit of U.S. Provisional Patent Application Ser. No. 62/060,625 filed on Oct. 7, 2014, entitled "ROTARY ELECTRO-MECHANICAL ACTUATOR OR ACTUATOR DEVICE", the entire disclosure of which is incorporated herein by reference.

BACKGROUND OF THE INVENTION

1. Field of the Invention

The present disclosure relates generally to clutch assemblies and, more specifically, to electro-mechanically actuated clutch assemblies.

2. Related Art

This section provides background information related to the present disclosure which is not necessarily prior art.

Automatic transmissions provide a plurality of forward and reverse speed or gear ratios by selectively actuating one or more brakes or clutches. One type of brake or clutch widely used in modern automatic transmissions is a one-way clutch (OWC) which overruns when one of its races (in radial clutch arrangement) or one of its drive plates (in axial clutch arrangements) rotates in a first (i.e., freewheel) direction relative to the other race or drive plate, and it engages or locks in a second (i.e., lockup) direction. Such conventional overrunning coupling devices provide no independent control over their operation, that is to say whether they lockup or freewheel in both directions. Thus, basic one-way clutches provide a "locked" mode in one rotary direction and a "freewheel" mode in the opposite rotary direction based on the direction that a torque is being applied to the input member.

There are however, requirements in automatic transmissions where "controllable" overrunning coupling devices, commonly referred to as selectable one-way clutches (SOWC), are selectively controlled to provide additional functions. Specifically, a selectable one-way clutch may further be capable of producing a freewheel mode in both directions until a command causes the clutch to shift into its lockup mode. Thus, a selectable one-way clutch may be capable of providing a drive connection between an input member and an output member in one or both rotational directions and may also be operable to freewheel in one or both rotational directions.

In some instances, the SOWC in automatic transmissions often utilize a high pressure hydraulic control system to selectively actuate the clutch and shift between the available operating modes. Examples of conventional selectable one-way clutches that are hydraulically controlled are disclosed in U.S. Pat. Nos. 8,079,453 and 8,491,439. In contrast, it is also known to provide an electromechanical actuator for the SOWC, examples of which are disclosed in U.S. Pat. Nos. 8,276,725 and 8,418,825. While such selectable one-way clutch configurations appear to meet all functional requirements, a need exists to continue development of new and improved selectable clutches, especially the type that do not require high pressure hydraulics for actuation.

SUMMARY

This section provides a general summary of disclosure and is not a comprehensive disclosure of its full scope or all of its aspects and features.

In one aspect of the present disclosure, the electro-mechanical clutch apparatus includes a stationary member including a center portion extending along an axis. A coil assembly is annularly disposed about the axis and is fixed to the center portion of the stationary member. The electro-mechanical clutch apparatus also includes a rotatable member that extends along the axis from a first end to a second end and which is rotatable relative to the stationary member. The second end of the rotatable member includes an annular projection that is disposed annularly about the axis and which is radially spaced from the stationary coil assembly. Further, a ratchet surface presenting a plurality of teeth is disposed in axially aligned and radially spaced relationship with the annular projection. The rotatable member includes at least one magnetic pole piece fixed to the annular projection and disposed in radially spaced relationship with the coil assembly for allowing the magnetic pole piece to rotate relative to and concentrically around the stationary coil assembly. The rotatable member includes at least one locking member pivotably attached to the annular projection adjacent the at least one magnetic pole piece. The locking member is pivotable between an engaged position in which the locking member is disposed in engagement with one of the plurality of teeth in response to the coil assembly being de-energized and a released position in which the locking member is displaced from engagement with said teeth and attracted towards the magnetic pole piece in response to the coil assembly being energized.

Further areas of applicability will become apparent from the description provided herein. The description and specific examples in this summary are not intended to limit the scope of the inventive concepts disclosed herein.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 1 is a cross-sectional side view of a first exemplary embodiment of an electro-mechanical clutch apparatus having a rotatable member including at least one locking member and magnetic pole piece rotatable relative to a stationary coil assembly in accordance with an aspect of the disclosure;

FIG. 2 is a cross-sectional view of the electro-mechanical clutch apparatus of FIG. 1 taken along 2-2 and illustrating the locking member in the first, or released, position;

DESCRIPTION OF THE ENABLING EMBODIMENTS

Figure 3:
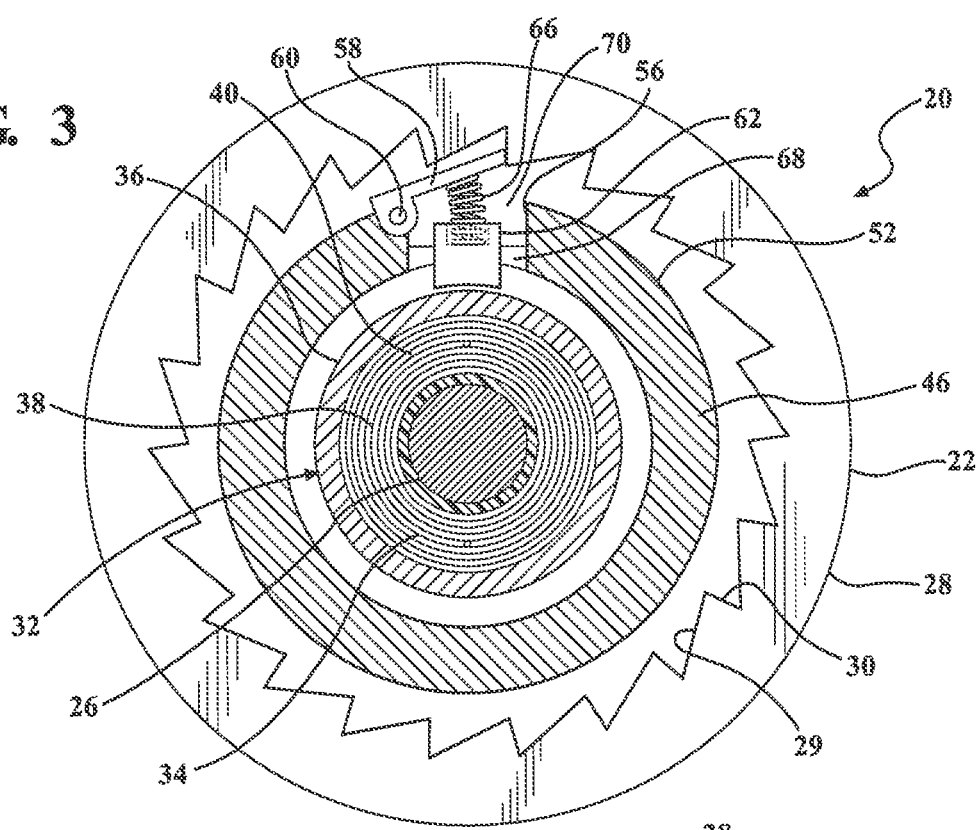
FIG. 3 is a cross-sectional view of the electro-mechanical clutch apparatus of FIG. 1 taken along 2-2 and illustrating the locking member disposed in engaging relationship with the locking teeth of a stationary member to define a second, or engaged, position.

Example embodiments will now be described more fully with reference to the accompanying drawings. Each of the example embodiments is directed to a clutch apparatus which includes an electromagnetically-actuated locking member. The example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need to be employed, that example embodiments may be embodiment in many different forms and that neither should be construed to limit the scope of the disclosure. In some example embodiments, well-known processes, well-known device structures, and well-known technologies are not described in detail.

The present disclosure is generally related to electromechanically actuated locking members, such as armatures, wedges, braces, sprags, or the like, that function to mechanically transfer torque and speed between a first rotatable member and a second rotatable or stationary member, such as internal or external gears, wet or dry clutch elements, or the like. The electro-mechanically actuated locking member can be incorporated into a variety of clutching mechanisms, such as multi-plate clutches, one-way clutches, dog clutches, and the like. The electro-mechanically actuated locking member is actuated via electrical actuation/controls such that when a voltage and/or current is applied to an electromagnetic coil assembly, the coil assembly becomes an electromagnet and produces a magnetic field. Magnetization or de-magnetization of the electromagnetic coil assembly functions to establish an "engaged" or "released" position of the locking member, respectively. Initially, when the coil assembly is de-magnetized, a biasing member, such as a spring, is permitted to forcibly pivot the locking member from its "released", or first, position, to its "engaged", or second, position in which the locking member engages one of a plurality of locking teeth associated with the second stationary or rotatable member. In the "engaged", or second, position the locking member effectively couples the first member to the second stationary or rotatable member for rotation together or against rotation in a certain rotational direction. Disengagement of the first member from the second member occurs as the voltage and/or current is applied to the coil assembly such that the locking member is attracted toward the coil assembly to disengage the locking member from its locking engagement with one of the plurality of locking teeth and disengage the transfer of torque and speed between the first and second members. When the coil assembly is once again de-magnetized, the biasing member urges the locking member to pivot from its released position back to its engaged position which, in turn, causes the first member to once again be coupled or locked to the second stationary or rotatable member.

Figure 4:
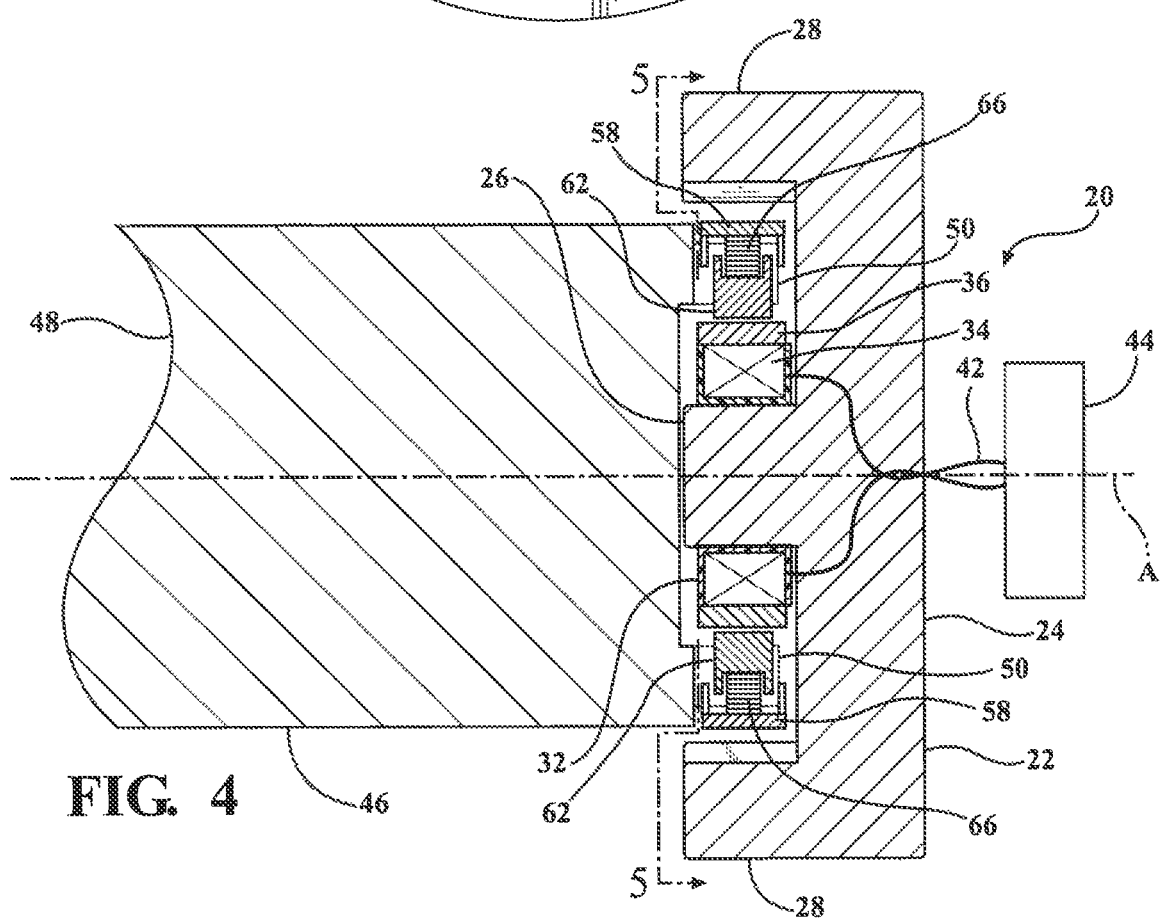
FIG. 4 is a cross-sectional side view of the first exemplary embodiment of the electromechanical clutch apparatus illustrating the rotatable member including a plurality of locking members and a plurality of magnetic pole pieces rotatable relative to the stationary coil assembly in accordance with an aspect of the disclosure.
Figure 5:
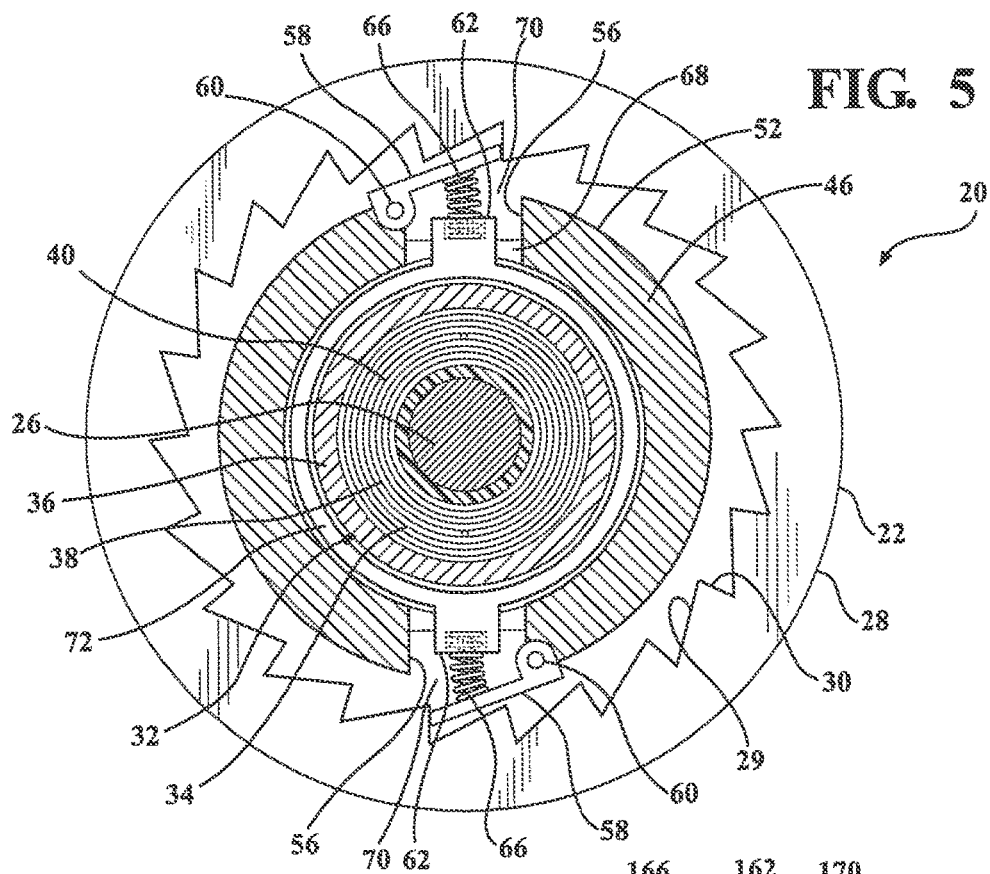
FIG. 5 is a cross-sectional view of the electro-mechanical clutch apparatus of FIG. 4 taken along 5-5 and illustrating the plurality of locking members in the second, or engaged, position.

Referring to FIGS. 1-5, wherein like numerals indicate corresponding parts throughout the several views, an electro-mechanical clutch apparatus 20 according to a first exemplary embodiment is generally shown. The first exemplary embodiment of the clutch apparatus 20 includes a stationary member 22, such as a housing, which includes a body 24, a center portion 26 extending from the body 24 along an axis A, and a peripheral portion 28 extending from the body 24 annularly about the axis A. In a preferred arrangement, the center portion 26 of the stationary member 22 is comprised of a ferrous or other suitable ferromagnetic material. The peripheral portion 28 presents a ratchet surface 29 which includes a plurality of locking teeth 30 extending radially therefrom and which are evenly distributed about the axis A and integral with the stationary member 22. A stationary coil assembly 32 is annularly disposed about the axis A and fixed to the center portion 26 of the stationary member 22. As best shown in FIGS. 2-3 and 5, the stationary coil assembly 32 includes a coil 34 mounted within a coil enclosure 36. In a preferred arrangement, the 34 comprises a copper wire 38 wrapped around a polymer bobbin 40 and the coil enclosure 36 is comprised of a ferrous or other suitable ferromagnetic material. As best shown in FIGS. 1 and 4, the coil 34 extends to a pair of terminal 42 which are electrically connected to a power source 44 to supply an electric current to the coil 44.

Figure 8:
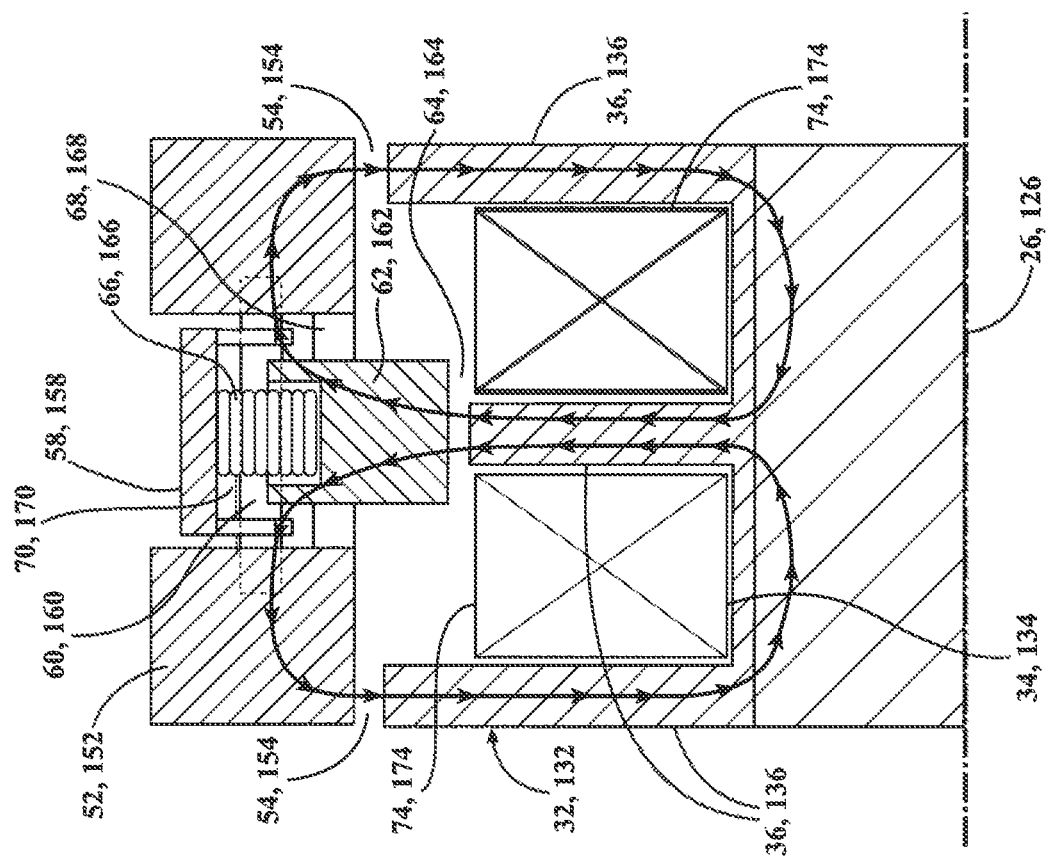
FIG. 8 is a fragmentary cross-sectional view of FIGS. 2, 3, 5, and 7 illustrating a magnetic flux circuit for the first and second exemplary embodiments of the electromechanical clutch apparatus.
Figure 9:
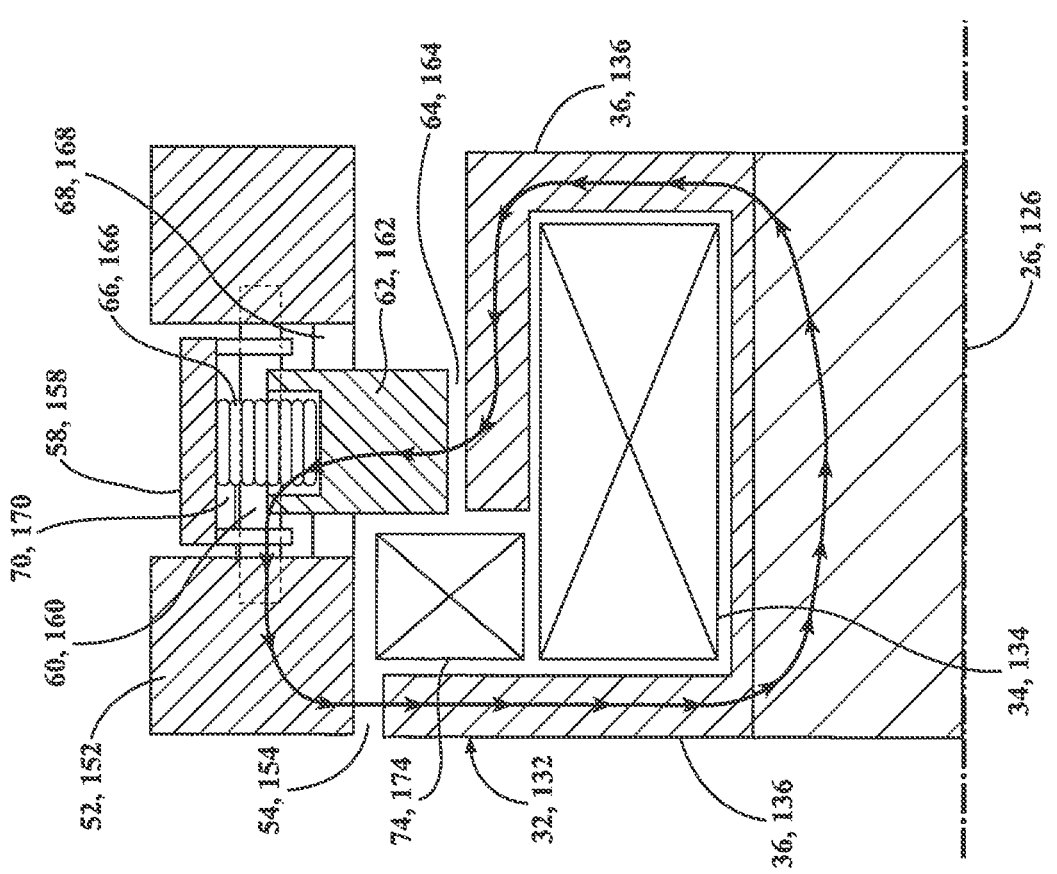
FIG. 9 is a fragmentary cross-sectional view of FIGS. 2, 3, 5, and 7 illustrating an alternative magnetic flux circuit for the first and second exemplary embodiments of the electromechanical clutch apparatus.

The clutch apparatus 20 further includes a rotatable member 46, such as a shaft, that extends along the axis A from a first end 48 to a second end 50 and is rotatable relative to the stationary member 22. The second end 50 of the rotatable member 46 includes an annular projection 52 disposed annularly about the axis A and radially spaced between the peripheral portion 28 and the stationary coil assembly 32. As best shown in FIGS. 2-3 and 5, the ratchet surface 29 is disposed in axially aligned and radially spaced relationship with the annular projection 52. As best shown in FIGS. 8-9, the radial spacing of the annular projection 52 relative to the stationary coil assembly 32 defines a first air gap 54 extending between the annular projection 52 and the coil enclosure 36. As best shown in FIGS. 2-3 and 5, the annular projection 52 defines at least one pocket 56 and a locking member 58, such as an armature, wedge, brace, sprag, or the like, is disposed next adjacent to the at least one pocket 54 for covering at least a portion of the at least one pocket in a first, or released, position. The locking member 56 is pivotably attached to the rotatable member 46 by way of a pin 60 and is pivotable from the first, or released, position in which the locking member 58 is disengaged from the locking teeth 30 of the stationary member 22, to a second, or engaged, position in which the locking member 56 opens the at least one pocket 54 and is disposed in engaging relationship with one of the locking teeth 30 of the stationary member 22. As best shown in FIGS. 3 and 5, when the locking member 58 is disposed in its second, or engaged, position, the locking member 58 effectively locks the rotatable member 46 from rotating in that direction when a current is not supplied to the coil assembly. In a preferred arrangement, the locking member 56 is comprised of ferrous material, a non-metallic material with a ferrous insert, or any other suitable ferromagnetic material.

As best shown in FIGS. 2-3 and 5, the rotatable member includes a magnetic pole piece 62 fixed within the at least one pocket 54 in axially spaced relationship with the annular projection 52 and radially spaced and concentrically aligned relationship with the stationary coil assembly 32 for allowing the magnetic pole piece 62 to rotate with the rotatable member 46 relative to and concentrically around the stationary coil assembly 32. As best shown in FIGS. 8 and 9, the radial spacing of the magnetic pole piece 62 relative to the stationary coil assembly 32 defines a second air gap 64 extending between the magnetic pole piece 62 and the coil enclosure 36. A biasing member 66, such as a spring, or the like, extends radially from the magnetic pole piece 62 and is disposed in biased relationship with the locking member 58 for biasing the locking member towards its second, or engaged, position and establishing a working air gap 68 between the magnetic pole piece 62 and the locking member 58. In a preferred arrangement, the magnetic pole piece 62 and biasing member 66 can be mounted within a carrier 68 which is placed within the at least one pocket 56 to establish the spaced and concentrically aligned relationship of the magnetic pole piece 62 with the rotatable member 46 and coil assembly 32, respectively. Such an arrangement improves an assembly or placement of the magnetic pole piece 62 and biasing member 66 relative to the stationary and rotatable members 22, 46. The carrier 68 can be an overmolded sub-assembly in which the magnetic pole pieces 62 are retained or steel stamped where the magnetic pole piece 62 consists of bent steel tabs integral to the carrier 68.

In operation, when voltage and/or current is applied to the coil 34, the coil 34 becomes an electromagnet producing an electric field (or flux). The flux flows outwards in all directions and, as best shown in FIGS. 8-9, results in a magnetic flux circuit being produced along each of the ferrous or ferromagnetic parts, namely serially extending along the central portion 26 of the stationary member 22, the coil enclosure 36, the first air gap 54, the magnetic pole piece 62, the pin 60, the peripheral portion 28 of the rotatable member 46, the second air gap 64, and back across to the coil enclosure 36. The magnetic flux magnetizes the magnetic pole piece 62, therefore generating an attractive magnetic force on the locking member 58 which overcomes the biasing force of the biasing member 66 and attracts or pivots the locking member 58 on the pin 60 towards the magnetic pole piece 62. This pivoting movement of the locking member 58 closes the working air gap 70 and establishes the second, or disengaged, position of the locking member 58. Put another way, disengagement of the locking member 58 from the locking teeth 30 of the stationary member 22 occurs when the stationary coil assembly 32 is magnetized, attracting the locking member 58 towards the magnetic pole piece 62 for allowing the rotatable member 46 to freely rotate in any direction relative to the stationary member 22. With reference to FIGS. 2-3 and 5, the magnetic pole piece 62 which is acting to produce torque on the locking member 58 when the coil assembly 32 is magnetized is essentially floating relative to the rotatable member 46 and the coil assembly 32 such that the magnetic pole piece 62 is magnetically communicating to the other poles over the first and second air gaps 54, 64 and the magnetic field is focused into the working air gap 70 disposed between the magnetic pole piece 62 and the locking member 58.

As best shown in FIGS. 2-3 and 5, the rotatable member includes a magnetic pole piece 62 fixed within the at least one pocket 54 in axially spaced relationship with the annular projection 52 and radially spaced and concentrically aligned relationship with the stationary coil assembly 32 for allowing the magnetic pole piece 62 to rotate with the rotatable member 46 relative to and concentrically around the stationary coil assembly 32. As best shown in FIGS. 8 and 9, the radial spacing of the magnetic pole piece 62 relative to the stationary coil assembly 32 defines a second air gap 64 extending between the magnetic pole piece 62 and the coil enclosure 36. A biasing member 66, such as a spring, or the like, extends radially from the magnetic pole piece 62 and is disposed in biased relationship with the locking member 58 for biasing the locking member towards its second, or engaged, position and establishing a working air gap 70 between the magnetic pole piece 62 and the locking member 58. In a preferred arrangement, the magnetic pole piece 62 and biasing member 66 can be mounted within a carrier 68 which is placed within the at least one pocket 56 to establish the spaced and concentrically aligned relationship of the magnetic pole piece 62 with the rotatable member 46 and coil assembly 32, respectively. Such an arrangement improves an assembly or placement of the magnetic pole piece 62 and biasing member 66 relative to the stationary and rotatable members 22, 46. The carrier 68 can be an overmolded sub-assembly in which the magnetic pole pieces 62 are retained or steel stamped where the magnetic pole piece 62 consists of bent steel tabs integral to the carrier 68.

A biasing member 66 extends from each of the magnetic pole pieces 62 and is disposed in biased relationship with a respective locking member 58 for biasing the locking member 58 towards its second, or engaged, position and establishing the working air 70 extending between each of the magnetic pole piece 62 and their respective locking members 58. In this arrangement, each of the locking members 58 are positioned in engaging relationship with one of the locking teeth 30 of the stationary member 22 in their second, or engaged, positions, effectively locking the rotatable member 46 from rotating in that direction when a current is not supplied to the stationary coil assembly 32. The utilization of a plurality of locking members 58 results in the balancing of any reaction load offset from the engaging relationship of the locking members 58 in the event the electro-mechanical clutch apparatus 20 transfers force or torque.

Similar to the arrangement which utilizes a single pocket 56 and locking member 58, in operation, when voltage and/or current is applied to the coil 34, an attractive magnetic force is generated on each of the locking members 58 which overcomes the biasing force of the respective biasing members 66 and attracts or pivots the locking members 58 on the pin 60 towards the respective magnetic pole piece 62. This pivoting movement of the locking members 58 closes the working air gaps 70 and establishes the second, or disengaged, position of the locking members 58 when the stationary coil assembly 32 is magnetized, allowing the rotatable member 46 to freely rotate in any direction relative to the stationary member 22. With reference to FIG. 5, the magnetic pole pieces 62 which are acting to produce torque on the locking member 58 when the coil assembly 32 is magnetized are essentially floating relative to the rotatable member 46 and the coil assembly 32 such that the magnetic pole piece 62 are magnetically communicating to the other poles over the first and second air gaps 54, 64 and the magnetic field is focused into the working air gaps 70 disposed between the magnetic pole pieces 62 and the locking members 58.

Figure 7:
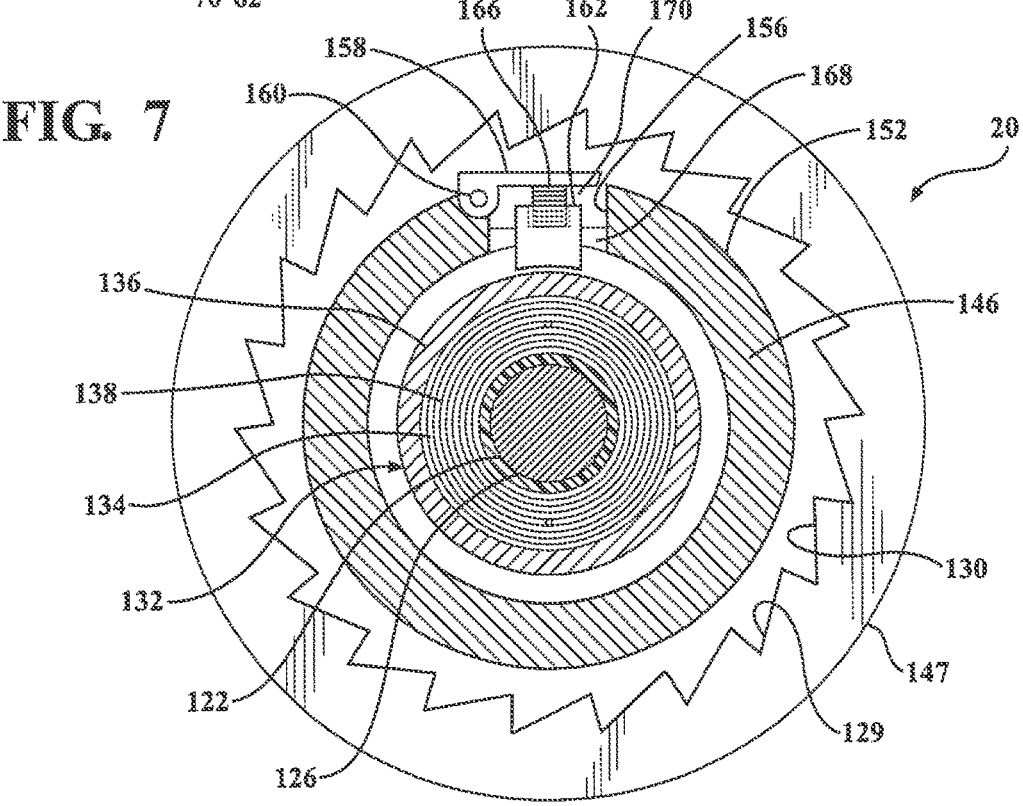
FIG. 7 is a cross-sectional view of the electromechanical clutch apparatus of FIG. 6 taken along 7-7 and illustrating the locking member in a first, or released, position.
Figure 6:
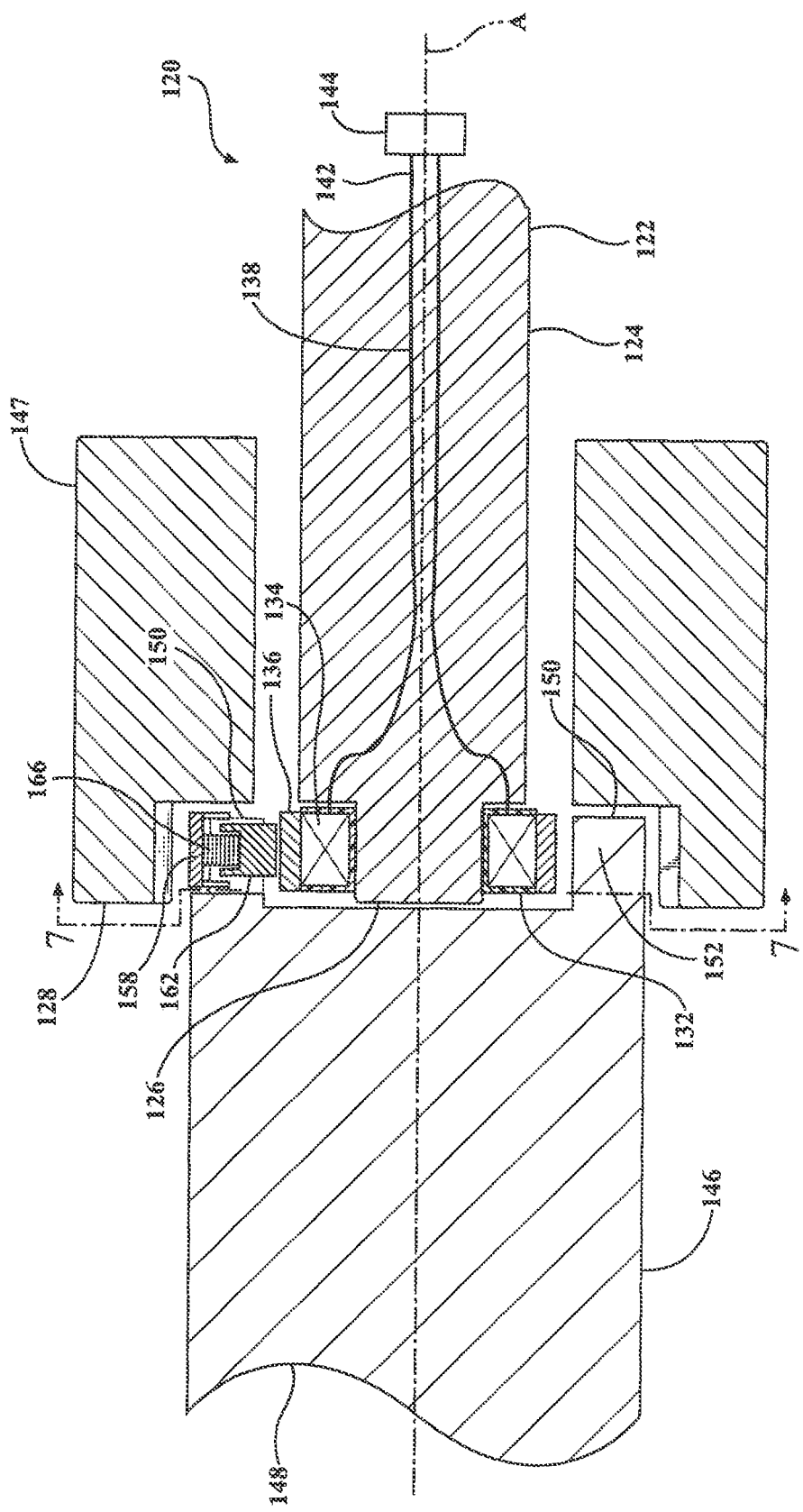
FIG. 6 is a cross-sectional side view of a second exemplary embodiment of the electromechanical clutch apparatus having a first rotatable member including at least one locking member and magnetic pole piece rotatable relative to a stationary coil assembly and a second rotatable member rotatable relative to the first rotatable member according to an aspect of the disclosure.

Referring to FIGS. 6-7, wherein like numerals indicate corresponding parts throughout the several views, an electro-mechanical clutch apparatus 120 according to a second exemplary embodiment is generally shown. The second embodiment of the clutch apparatus 120 includes a stationary member 122, such as a housing, which includes a body 124 and a center portion 126 extending from said body 124 along an axis A. In a preferred arrangement, the center portion 126 of the stationary member 122 is comprised of a ferrous or other suitable ferromagnetic material. A stationary coil assembly 132 is annularly disposed about the axis A and fixed to the center portion 126 of the stationary member 122. As best shown in FIG. 7, the stationary coil assembly 132 includes a coil 134 mounted within a coil enclosure 136. In a preferred arrangement, the coil 134 comprises a copper wire 138 wrapped around a polymer bobbin 140 and the coil enclosure 136 is comprised of a ferrous or other ferromagnetic material. As best shown in FIG. 6, the copper wire 138 extends to a pair of terminals 142 which are electrically connected to a power source 144 to supply an electric current to the coil 134.

The electro-mechanical clutch apparatus 120 further includes a first rotatable member 146, such as a shaft, that extends along the axis A from a first end 148 to a second end 150 and which is rotatable relative to the stationary member 122. The second end 150 of the rotatable member 146 includes an annular projection 152 disposed annulary about the axis A and in surrounding and spaced relationship with the stationary coil assembly 132. As best shown in FIGS. 8 and 9, the radial spacing of the annular projection 152 defines a first air gap 154 extending between the annular projection 152 and the coil enclosure 136. The electro-mechanical clutch apparatus 120 of the second embodiment further includes a second rotatable member 147, such as a shaft, that extends along the axis A and is rotatable relative to both the first rotatable member 146 and the stationary member 122. As best shown in FIG. 6, the second rotatable member 147 includes a peripheral portion 128 which is disposed annulary about the axis A and in surrounding and radially spaced relationship with the annular projection 152 of the first rotatable member 146. As best shown in FIG. 7, the peripheral portion 128 presents a ratchet surface 129 which includes a plurality of teeth 130 extending radially therefrom and which are evenly distributed about the axis A and integral with the second rotatable member 146. The plurality of teeth 130 are disposed in axially aligned and radially spaced relationship with the annular projection 152 of the first rotatable member 146.

As best shown in FIG. 7, the annular projection 152 of the first rotatable member 146 defines at least one pocket 156 and a locking member 158, such as an armature, wedge, brace, sprag, or the like, is disposed next adjacent to the at least one pocket 154 for covering at least a portion of the at least one pocket 154 in a first, or released, position of the locking member 158. The locking member 158 is pivotably attached to the first rotatable member 146 by way of a pin 160 and is pivotable from the first, or released, position in which the locking member 158 is disengaged from the teeth 130 of the second rotatable member 147. When the locking member 158 is disposed in its second, or engaged, position, the locking member 158 effectively prevents relative displacement of the first and second rotatable members 146, 147 in the counter-clockwise direction when a current is not supplied to the stationary coil assembly 132 and engages the teeth 130 of the second rotatable member 147 which is intended to carry torque and speed. In a preferred embodiment, the locking member 156 is comprised of a ferrous material, a non-metalic material with a ferrous insert, or any other suitable ferromagnetic material.

As best shown in FIG. 7, the first rotatable member 146 includes a magnetic pole piece 162 fixed within the pocket 164 in axially spaced relationship with the annular projection 152 and radially spaced and concentrically aligned relationship with the stationary coil assembly 132 for allowing the magnetic pole piece 162 to rotate with the first rotatable member 146 relative to and concentrically around the stationary coil assembly 132. As best shown in FIGS. 8 and 9, the radial spacing of the magnetic pole piece 162 relative to the stationary coil assembly 132 defines a second air gap 164 extending between the magnetic pole piece 162 and the coil enclosure 136. A biasing member 166, such as a spring, or the like, extends from the magnetic pole piece 162 and is disposed in biased relationship with the locking member 158 for biasing the locking member 158 towards its second, or engaged position and establishing a working air gap 170 extending between the magnetic pole piece 162 and the locking member 158.

In operation, when voltage and/or current is applied to the coil 134, the coil 134 becomes an electromagnet producting an electric field (or flux). The flux flows outwards in all directions, and as best shown in FIGS. 8 and 9, results in a magnetic flux circuit being produced along each of the ferrous or ferromagnetic parts, namely serially along the central portion 126 of the stationary member, the coil enclosure 136, the first air gap 154, the magnetic pole piece 162, the pin 160, the peripheral portion 128 of the rotatable member 146, the second air gap 164, and back across the coil enclosure 136. As also shown in FIGS. 8 and 9, the magnetic flux magnetizes the magnetic pole piece 162, therefore generating an attractive magnetic force on the locking member 158 which overcomes the biasing force of the biasing member 166 and attracts or pivots the locking member 158 on the pin 160 towards the magnetic pole piece 162. This pivoting movement of the locking member 158 closes the working air gap 170 and establishes the first, or released, position of the locking member. Put another way, disengagement of the locking member 158 from the teeth 130 of the second rotatable member 147 occurs when the stationary coil assembly 132 is magnetized, allowing the first rotatable member 146 and the second rotatable member 147 to freely rotate in any direction relative to one another.

As best shown in FIGS. 8 and 9, in both exemplary embodiments of the electro-mechanical clutch apparatus 20, 120, the stationary coil assembly 32, 132 can include an additional coil 74, 174 mounted within the coil enclosure 36, 136. As best shown in FIG. 8, in one arrangement the additional coil 74, 174 is disposed radially outwardly of the coil 34, 134 and next adjacent to the magnetic pole piece 62, 162. Alternatively, as best shown in FIG. 9, in another arrangement the additional coil 74, 174 is disposed next adjacent and in axially spaced relationship with the coil 34, 134. In this alternative arrangement, the coil enclosure 36, 136 establishes the axially spaced relationship between the coil 34, 134 and the additional coil 74, 174 acts to create a second mirror-imaged magnetic flux circuit which also serially passes along the central portion 26, 126 of the stationary member 22, 122, the coil enclosure 36, 136, the magnetic pole piece 62, 162, the pin 60, 160, the annular projection 52, 152 of the rotatable member 46, 146, and back across the coil enclosure 36, 136.

The foregoing descriptions of the embodiments have been provided for purposes of illustration and description. It is not intended to be exhaustive or to limit the disclosure. Individual elements or features of a particular embodiment are generally not limited to that particular embodiment, but, where applicable, are interchangable and can be used in a selected embodiment, even if not specifically shown or described. The same may also be varied in many ways. Such variations are not to be regarded as a departure from the disclosure, and all such modifications are intended to be included with the scope of the disclosure.

What is claimed is:

1. An electro-mechanical clutch apparatus, comprising:
a stationary member including a center portion extending along an axis A;
a stationary coil assembly annularly disposed about the axis A and fixed to said center portion of said stationary member;
a rotatable member extending along the axis A from a first end to a second end and rotatable relative to said stationary member;
said second end of said rotatable member including an annular projection disposed annularly about the axis A and radially spaced from said stationary coil assembly;
a ratchet surface presenting a plurality of teeth disposed in axially aligned and radially spaced relationship with said annular projection;
said rotatable member including at least one magnetic pole piece fixed to said annular projection and disposed in radially spaced and concentrically aligned relationship with said coil assembly for allowing said magnetic pole piece to rotate relative to and concentrically around said stationary coil assembly;
said rotatable member including at least one locking member pivotably attached to said annular projection adjacent said at least one magnetic pole piece, said locking member pivotable between an engaged position in engagement with one of said plurality of teeth in response to said coil assembly being de-energized and a released position displaced from engagement with said plurality of teeth and attracted towards said at least one magnetic pole piece in response to said coil assembly being energized; and
a biasing member extending radially from said magnetic pole piece and disposed in biased relationship with said at least one locking member for biasing said at least one locking member towards said engaged position in response to said coil assembly being de-energized.

2. The electro-mechanical clutch apparatus as set forth in claim 1, wherein said at least one magnetic pole piece is disposed within a pocket defined by said annular projection and said biasing member covers at least a portion of said pocket in said released position.

3. The electro-mechanical clutch apparatus as set forth in claim 2, wherein said stationary coil assembly includes a coil mounted within a coil enclosure comprised of ferromagnetic material.

4. The electro-mechanical clutch apparatus as set forth in claim 3, wherein said radially spaced relationship of said annular projection relative to said stationary coil assembly defines a first air gap extending between said annular projection and said coil enclosure, and said radially spaced relationship of said magnetic pole piece relative to said stationary coil assembly defines a second air gap extending between said magnetic pole piece and said coil enclosure, and said biased relationship of said biasing member with said locking member establishes a working air gap extending between said magnetic pole piece and said locking member.

5. The electro-mechanical clutch apparatus as set forth in claim 4, wherein said rotatable member includes a pin disposed adjacent said at least one pocket for pivotably connecting said locking member to said rotatable member.

6. The electro-mechanical clutch apparatus as set forth in claim 5, further including a magnetic flux circuit extending serially along said central portion of said stationary member, said coil enclosure, said first air gap, said magnetic pole piece, said pin, said peripheral portion of said rotatable member, and said coil enclosure when said stationary coil assembly is energized for attracting said locking member towards said magnetic pole piece and closing said working gap.

7. The electro-mechanical clutch apparatus as set forth in claim 1, further including a plurality of magnetic pole pieces fixed to said annular projection and each disposed in radially spaced and concentrically aligned relationship with said coil assembly, and a plurality of locking members pivotably attached to said annular projection each adjacent a respective one of said plurality of magnetic pole pieces.

8. The electro-mechanical clutch apparatus as set forth in claim 7, wherein said annular projection defines a plurality of pockets each disposed in axially and equidistantly spaced relationship to one another, and each of said plurality of magnetic pole pieces fixed within a respective one of said plurality of pockets.

9. The electro-mechanical clutch apparatus as set forth in claim 8, further including a plurality of biasing members each extending from a respective one of said magnetic pole pieces and disposed in biasing relationship with a respective one of said plurality of locking members.

10. The electro-mechanical clutch apparatus as set forth in claim 9, wherein said rotatable member includes a plurality of pins each disposed adjacent a respective one of said plurality of pockets for pivotably connecting a respective one of said plurality of locking members to said rotatable member.

11. The electro-mechanical clutch apparatus as set forth in claim 1, wherein said stationary member includes a peripheral portion extending from said body annularly about said axis and presenting said ratchet surface, and said annular projection of said rotatable member disposed in radially spaced relationship between said peripheral portion and said stationary coil assembly.

12. The electro-mechanical clutch apparatus as set forth in claim 1, further including a second rotatable member extending along said axis and rotatable relative to said first rotatable member and said stationary member, said second rotatable member including a peripheral portion disposed annularly about said axis in surrounding and radially spaced relationship with said annular projection of said first rotatable member, and said peripheral portion presenting said ratchet surface.

13. The electro-mechanical clutch apparatus as set forth in claim 2, further including an additional coil mounted within said coil enclosure and disposed radially outwardly of said coil and next adjacent said magnetic pole piece.

14. The electro-mechanical apparatus as set forth in claim 2, further including an additional coil mounted within said enclosure and disposed next adjacent and in axially spaced relationship with said coil, and said coil extending between said coil and said additional coil to establish said axially spaced relationship therebetween.

15. The electro-mechanical clutch apparatus as set forth in claim 1, wherein said center portion comprises ferromagnetic material.

16. The electro-mechanical clutch apparatus as set forth in claim 1, wherein said center portion is integral with said stationary member.

17. The electro-mechanical clutch apparatus as set forth in claim 1, wherein said rotatable member includes a shaft.

18. The electro-mechanical clutch apparatus as set forth in claim 7, wherein said plurality of magnetic pole pieces are equally circumferentially spaced around said annular projection.

19. The electro-mechanical clutch apparatus as set forth in claim 18, wherein said plurality of locking members are oriented in the same circumferential direction.

* * * * *